US007595911B2

(12) United States Patent
Dolan

(10) Patent No.: US 7,595,911 B2
(45) Date of Patent: Sep. 29, 2009

(54) METHODS AND SYSTEMS FOR DESCREENING A DIGITAL IMAGE

(75) Inventor: John E. Dolan, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 625 days.

(21) Appl. No.: 11/349,999

(22) Filed: Feb. 7, 2006

(65) Prior Publication Data

US 2007/0182995 A1  Aug. 9, 2007

(51) Int. Cl.
*G06K 15/00* (2006.01)
*G06T 5/00* (2006.01)
*G06K 9/40* (2006.01)

(52) U.S. Cl. .................. 358/3.08; 358/3.26; 358/1.9; 382/260; 382/279

(58) Field of Classification Search .............. 358/1.9, 358/3.08, 3.26; 382/262–266, 260, 279
See application file for complete search history.

(56) References Cited

U.S. PATENT DOCUMENTS 6,924,839 B2 * 8/2005 Eiho et al. ............... 348/252

FOREIGN PATENT DOCUMENTS

JP     06-317436     7/1996

OTHER PUBLICATIONS

Japanese Office Action for corresponding foreign case-JP2007-028468-dated Jul. 7, 2008.
Giovanni Ramponi and Andrea Polesel, "Rational unsharp masking technique," Journal of Electronic Imaging, Apr. 1998, pp. 333-338, vol. 7(2), SPIE and IS&T, USA.
G. Ramponi et al., "Nonlinear Contrast Enhancement Based on the Retinex Approach," Image Processing: Algorithms and Systems II, E. Dougherty et al., Editors, Proceedings of SPIE-IS&T Electronic Imaging, SPIE vol. 5014, 2003, pp. 169-177, SPIE and IS&T, USA.
Alejandro Jaimes et al., "Segmentation and Automatic Descreening of Scanned Documents," 1999 IS&T/SPIE International Symposium onElectronic Imaging Science and Technology, Jan. 1999, Proceedings vol. 3648, pp. 517-528, USA.
Christopher M. Miceli and Kevin Parker, "Inverse halftoning," Journal of Electronic Imagaing , Apr. 1992, pp. 143-151, vol. 1(2), SPIE and IS&T, USA.
Zixiang Xiong et al., "A Wavelet-based Approach to Inverse Halftoning," Proceedings IS&T/SPIE vol. 3018, pp. 89-100, Feb. 1997, San Jose, CA, USA.
Jiebo Luo et al., "Universal Descreening Technique Via Wavelet Analysis," Proceedings IS&T/SPIE vol. 3018, pp. 18-29, Feb. 1997, San Jose, CA, USA.

* cited by examiner

*Primary Examiner*—King Y Poon
*Assistant Examiner*—Javier Segura
(74) *Attorney, Agent, or Firm*—Kristine E. Matthews; David C. Ripma

(57) ABSTRACT

Embodiments of the present invention comprise methods and systems for descreening a digital image.

20 Claims, 4 Drawing Sheets

METHODS AND SYSTEMS FOR DESCREENING A DIGITAL IMAGE

FIELD OF THE INVENTION

Embodiments of the present invention comprise methods and systems for descreening digital images.

BACKGROUND

Many printed documents contain halftone images that are 1-bit images consisting of dot patterns on a contrasting background. Often the images are composed of black dots printed on light-colored media such as the newsprint of a newspaper. The human eye perceives a grayscale image from the 1-bit, halftone image. While halftone dot patterns reduce the bit-depth of a digital image and maintain the grayscale appearance to a viewer, the characteristics of the quantized image are considerably different than those of a continuous-tone or grayscale image.

When halftone images are scanned or otherwise transformed into digital images, it is often advantageous to process the image to enhance image characteristics or to compress the image to reduce the size of the image file for storage or transmission. Some image processing operations, such as filtering, decimation, interpolation, sharpening, and others, do not work well on halftone images. The high-frequency distribution of dots in halftone images precludes using many image processing methods that function well with grayscale images.

Halftone dot modulation can have deleterious effects when compressing, processing, or reprinting the scanned image. Because many grayscale image processing algorithms and compression methods do not perform well on halftone images, the halftone images must be transformed from halftone to grayscale. This process may be referred to as inverse halftoning or descreening.

Some existing methods for descreening may employ low-pass filtering. However, low-pass filtering that is sufficient to smooth the high-frequency patterns of halftone images will not preserve text and line art edges and other detailed content of the image. It is desirable to maintain edges corresponding to significant image structure. The goal of preservation of image structure precludes the use of simple smoothing techniques.

Accordingly, low-pass filtering methods typically result in grainy or blurred images.

Other existing methods may employ a neural network to transform an image from halftone to grayscale. These methods require training of the neural network and are typically not optimal over a range of halftone techniques. These methods generally do not take advantage of a priori constraints or the nature of the halftone mask, when it is known.

Some current descreening methods involve a wavelet representation that allows selection of useful information from each wavelet band. This may be performed by applying a nonorthogonal, overcomplete, wavelet transform to a halftone image. The high-pass wavelet images are dominated by halftoning blue noise, whose power increases with respect to frequency. Adaptive filtering must then be applied to segregate image detail from halftone modulation. These filters may be adaptive in both space and frequency bands.

Each of the above-described methods has drawbacks related to performance or complexity of the process. It would be advantageous to have a method of descreening that provides superior performance to the more simplistic filtering methods without the complexity of the neural network and wavelet methods.

SUMMARY

Embodiments of the present invention comprise systems and methods for descreening a digital image. These embodiments comprise methods and systems for removing or reducing halftone dot modulation from scanned, or otherwise digital, halftone image data.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention, but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Figure 1:
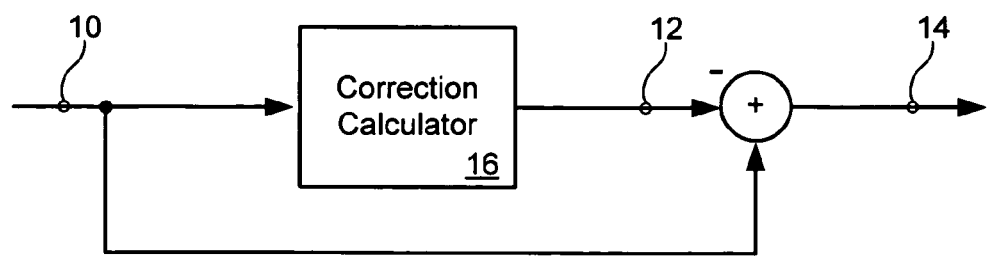
FIG. 1 is a diagram showing an exemplary embodiment of the present invention comprising a correction calculator.

Some embodiments of the present invention may be described with reference to FIG. 1. These embodiments may comprise a correction calculator 16 for generating a correction image 12. A corrected image 14 of an original image 10 may be formed by combining the correction image 12 with an original image 10. FIG. 1 shows an additive combination of the correction image 12 and the original image 10, which, when combined, form a corrected image 14. Other embodiments may comprise non-additive combinations of the correction image 12 and the original image 10. In some embodiments of the present invention, the input image 10 may be a halftone image and the corrected image 14 is a descreened version of the input image 10.

In an exemplary embodiment, a smoothed image 14 is generated by subtracting a correction image 12 from an input image 10. In some embodiments, the input image 10 may be a luminance image. A luminance image may comprise luminance channel data from a complete image comprising luminance and chrominance channel data. In other embodiments, input image 10 may comprise chrominance channel data or data from other image channels.

In some embodiments, the correction image 12 may be calculated by the correction calculator 16 based on characteristics of the input image 10. The gradient of the input image 10 and the second derivative of the input image 10 may be the characteristics of the input image 10 from which the correction calculator 16 calculates the correction image 12 in some embodiments. In other embodiments, other input image characteristics may be used in correction image 12 calculations.

In some embodiments, the correction image 12 may be determined and applied on a pixel-by-pixel basis. In other embodiments, the correction calculator 16 may comprise an array processor, or other processing means, to produce the correction image 12 on a basis that does not require pixel-by-pixel calculations.

Figure 2:
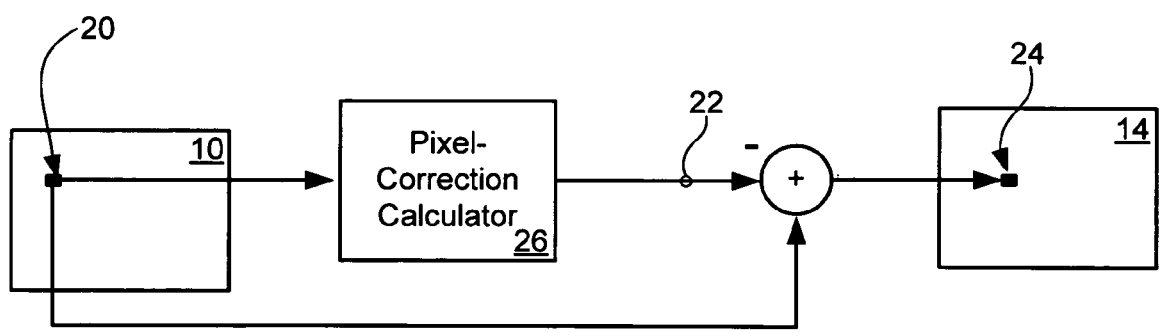
FIG. 2 is a diagram showing an exemplary embodiment of the present invention comprising a pixel-correction calculator.

Some embodiments of the present invention may be described with reference to FIG. 2. In these embodiments, the value of a smoothed-image pixel 24 may be given by the difference between the value of the corresponding pixel 20 in the input image 10 (e.g., the pixel at the same spatial location) and a pixel-correction term 22 calculated for that pixel 20 by a pixel-correction calculator 26. In other embodiments, the pixel-correction term 22 may be combined with the input image pixel value 20 by other methods.

Some embodiment of the present invention may be described with reference to FIG. 3. In these embodiments, a pixel-correction calculator 26 may use a pixel value of a pixel 20 in an input image 10 and the values of several neighboring pixels 31-48 in generating a pixel correction term 22. In other embodiments, the support of the pixel-correction calculations may include other pixels and/or other image characteristics.

In some embodiments, image values at pixels 20, 31, and 35, denoted v20, v31, and v35, respectively, may be used to approximate the second derivative of the input image 10 at the input-image pixel 20 in the vertical (or y) direction. Image values at pixels 20, 41, and 45, denoted v20, v41, and v45, respectively, may be used to approximate the second derivative of the input image 10 at the input-image pixel 20 in the horizontal (or x) direction.

In some embodiments, approximation of the second derivative at the input-image pixel 20 in the x direction may be given by $-v45+2v20-v41$, denoted D$2x$.

In some embodiments, approximation of the second derivative at the input-image pixel 20 in the y direction may be given by $-v31+2v20-v35$, denoted D$2y$.

In other embodiments, the second derivative may be approximated using non-separable filters or by other methods.

In some embodiments, image values at pixels 31-38, denoted v31, v32, v33, v34, v35, v36, v37, and v38, respectively, may be used to approximate the gradient of the input image 10 at the input-image pixel 20 in the vertical (or y) direction. Image values at pixels 41-48, denoted v41, v42, v43, v44, v45, v46, v47, and v48 may be approximate the gradient of the input image 10 at the input-image pixel 20 in the horizontal (or x) direction.

Approximation of the gradient at the input-image pixel 20 in the x direction may be given by $$\frac{1}{64}(-v48 - 6v47 - 14v46 - 14v45 + 14v41 + 14v42 + 6v43 + v44),$$

denoted Gx.

Approximation of the gradient at the input-image pixel 20 in the y direction may be given by $$\frac{1}{64}(-v38 - 6v37 - 14v36 - 14v35 + 14v31 + 14v32 + 6v33 + v34),$$

dentoed Gy.

In other embodiments, the gradient may be approximated using non-separable filters or by other methods.

In some embodiments, the correction term 22 for the input-image pixel 20 may be given by $$\frac{D2x}{S|Gx|+k} + \frac{D2y}{S|Gy|+k},$$

where S=1 and k=5 in some embodiments.

Figure 3:
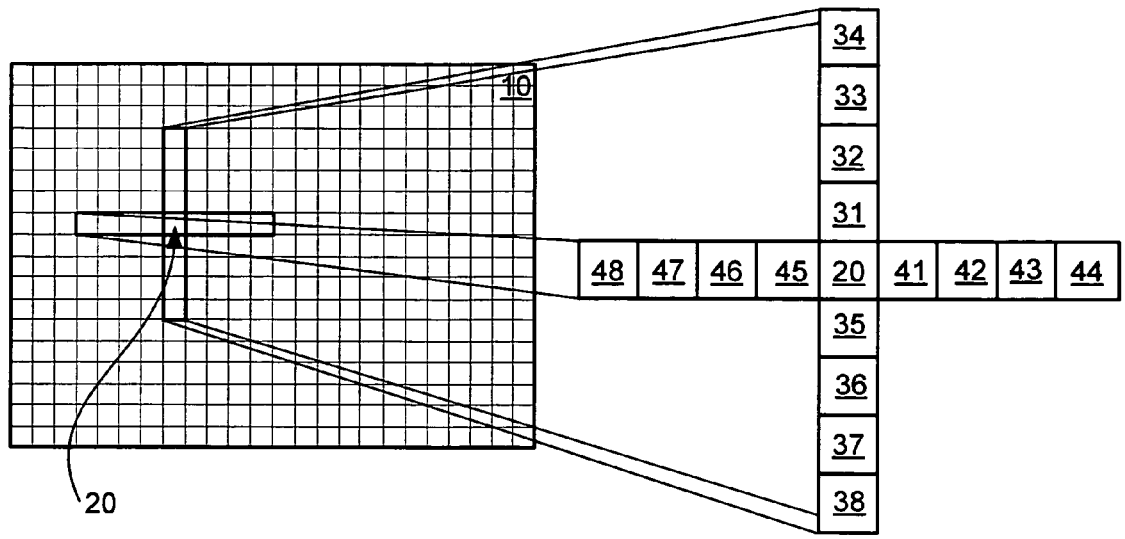
FIG. 3 is a diagram showing, for an exemplary embodiment of the present invention, the image pixels used in calculating the correction value for a pixel.

In some embodiments, the pixel-correction calculator 26 may use the pixel value of a pixel 20 in the input image 10 and the values of several neighboring pixels, shown in FIG. 3. In some embodiments, if a neighboring pixel lies outside the image region, the value of the nearest pixel that is inside the image region may be used in place of the value of the neighboring pixel that is outside the image for calculation in the pixel-correction calculator 26. Some embodiments of the present invention may correct only pixels for which all neighboring values required by the pixel-correction calculator 26 lie inside the image.

Some embodiments of the present invention comprise an iterative process in which, at each iteration, an iteration or input image is corrected based on characteristics of the iteration or input image. Some of these embodiments may be described with reference to FIG. 4. These embodiments of the present invention may comprise a correction calculator 56 for calculating a correction image 52. These embodiments may further comprise a correction combiner 53 for combining a correction image 52 with an input image 50 or iteration image 51. These embodiments may further comprise an iteration terminator 60, for determining when iterations will terminate. These embodiments may further comprise an iteration image buffer 68 for storing a modified iteration image 54 and feeding the iteration image 54 back into the correction calculator 56 for another iteration.

Figure 4:
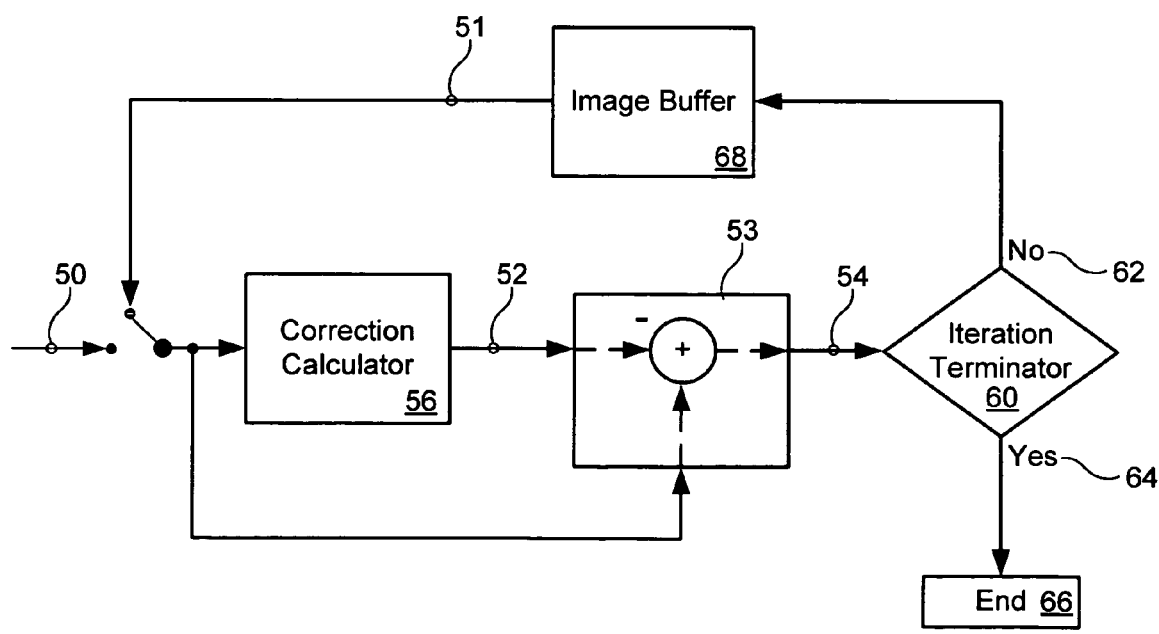
FIG. 4 is a diagram showing an exemplary embodiment of the present invention comprising an iterative process.

In some embodiments, illustrated in FIG. 4, image combiner 53 performs an additive combination of the correction image 52 and the input image 50 or iteration image 51. Other embodiments may comprise non-additive combinations of the correction image 52 and the input image 50 or iteration image 51. In some embodiments of the present invention, the input image 50 is a halftone image at the first iteration and the updated image 54 is a descreened or partially-descreened version of the input image 50.

In an exemplary embodiment, a modified image 54 is generated at each iteration by subtracting a correction image 52 from an input image 50 on the first iteration and by subtracting a correction image 52 from a modified iteration image 54 on subsequent iterations. After the modified image 54 is generated, an iteration termination condition may be checked at the iteration terminator 60. If the iteration termination condition is not met 62, the modified image 54 becomes the iteration image 51 used as input for the next iteration. The iterations may be terminated 66 when the iteration termination condition is met 64.

The correction image 52 may be calculated by a correction calculator 56 based on characteristics of the input image 50 or iteration image 51. In some embodiments, illustrated in FIG. 5, a correction image 52 may be determined on a pixel-by-pixel basis using a pixel-correction calculator 76. In other embodiments, the correction calculator 76 may comprise array processors or other means to produce the correction image 52 on a basis not requiring pixel-by-pixel calculations.

Figure 5:
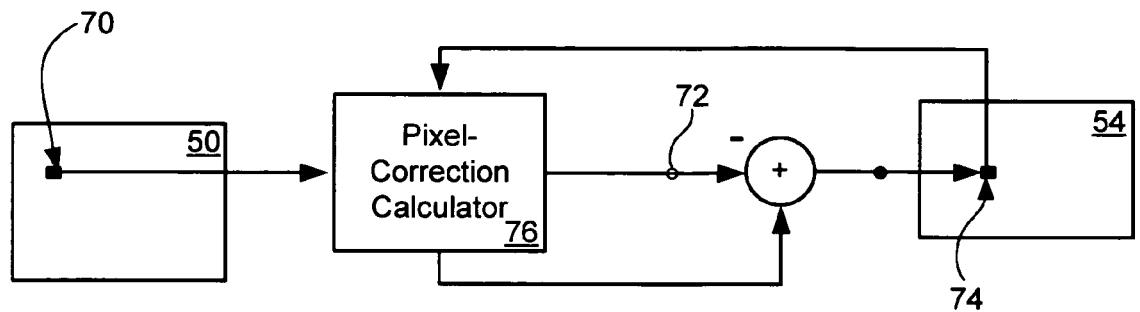
FIG. 5 is a diagram showing an exemplary embodiment of the present invention comprising a pixel-correction calculator.

In the exemplary embodiments shown in FIG. 5, the value of a modified image pixel 74 may be obtained by applying a correction to the corresponding pixel in the input image 50 or iteration image 54 that is being processed. In some embodiments, this correction may be accomplished by taking the difference between the value of the corresponding pixel 70 in the input image 50 or iteration image 54 (i.e., the pixel at the same spatial location) and a pixel-correction term 72 calculated for that pixel.

In some embodiments, the pixel-correction calculator 76 may use the pixel value of the pixel 70 in the input image 50 or iteration image 54 and the values of one or more neighboring pixels. In some embodiments, illustrated in FIG. 6, these neighboring pixels 81-88 and 91-98 are the adjacent pixel immediately above, below, to the right and to the left of the pixel being processed 70. In other embodiments, the support of the pixel-correction calculations may include other pixels.

In some embodiments, image values at pixels 70, 81, and 85, denoted v70, v81, and v85, respectively, may be used to approximate the second derivative of the iteration-input image 50 at the iteration-input-image pixel 70 in the vertical (or y) direction. Image values at pixels 70, 91, and 95, denoted v70, v95, and v95, respectively, may be used to approximate the second derivative of the iteration-input image 50 at the iteration-input-image pixel 70 in the horizontal (or x) direction.

In some embodiments, approximation of the second derivative at the iteration-input-image pixel 70 in the x direction may be given by $-v95+2v70-v91$, denoted d2$x$.

In some embodiments, approximation of the second derivative at the iteration-input-image pixel 70 in the y direction may be given by $-v81+2v70-v85$, denoted d2$y$.

In other embodiments, the second derivative may be approximated using non-separable filters.

In some embodiments, image values at pixels 81-88, denoted v81, v82, v83, v84, v85, v86, v87, and v88, respectively, may be used to approximate the gradient of the iteration-input image 50 at the iteration-input-image pixel 70 in the vertical (or y) direction. Image values at pixels 91-98, denoted v91, v92, v93, v94, v95, v96, v97, and v98 may be used to approximate the gradient of the iteration-input image 50 at the iteration-input-image pixel 70 in the horizontal (or x) direction.

In some embodiments, approximation of the gradient at the iteration-input-image pixel 70 in the x direction may be given by $$\frac{1}{64}(-v98 - 6v97 - 14v96 - 14v95 + 14v91 + 14v92 + 6v93 + v94),$$

denoted gx.

In some embodiments, approximation of the gradient at the iteration-input-image pixel 70 in the y direction may be given by $$\frac{1}{64}(-v88 - 6v87 - 14v86 - 14v87 + 14v81 + 14v82 + 6v83 + v84),$$

denoted gy.

In other embodiments, the gradient may be approximated using non-separable filters.

In some embodiments, the pixel-correction term 72 for the iteration-input-image pixel 70 is $$\frac{d2x}{S|gx|+k} + \frac{d2y}{S|gy|+k},$$

where S=1 and k=5 in some embodiments. In an exemplary embodiment, S is the same for each iteration, and k is the same for each iteration. In some embodiments, S may vary with iteration.

Figure 6:
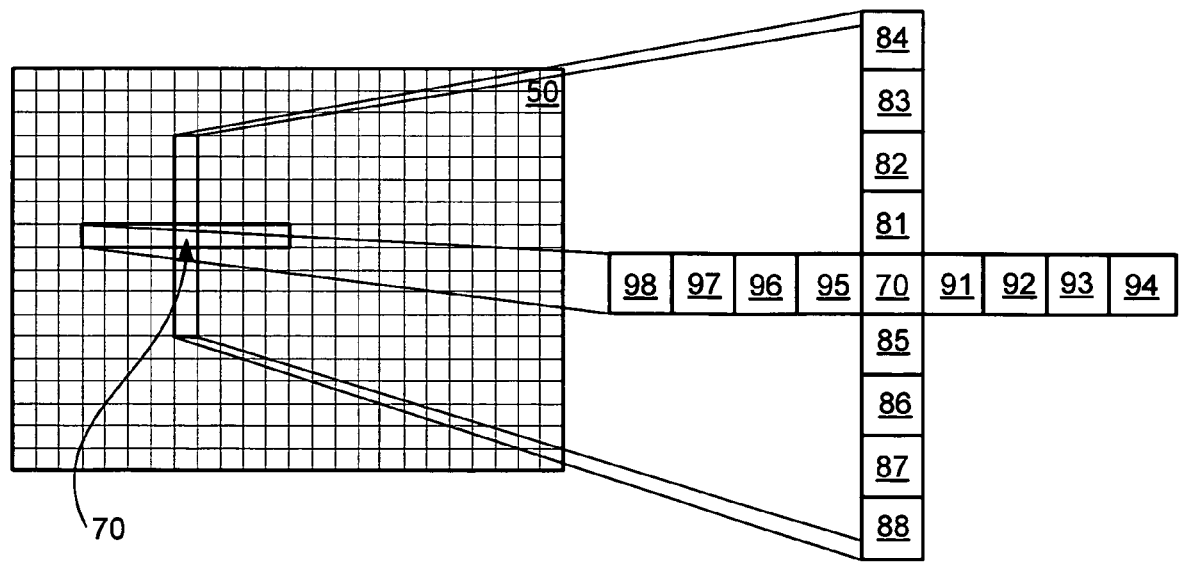
FIG. 6 is a diagram showing, for an exemplary embodiment of the present invention, the image pixels used in calculating the correction value for a pixel for an iteration.

In an exemplary embodiment, the pixel-correction calculator 76 may use the pixel value of the pixel in the input image 50 or iteration image 54 and the values of one or more neighboring pixels, such as those shown in FIG. 6. In some embodiments, if a neighboring pixel lies outside the image region, the value of the nearest pixel that is inside the image region may be used in the pixel-correction calculator 76. Some embodiments of the present invention may correct only pixels for which all neighboring values required by the pixel-correction calculator 76 lie inside the image.

In some embodiments of the present invention, a high-stop filter is used to smooth a digital image containing halftone regions. In some embodiments, the high-stop filter is applied iteratively, at the first iteration, to the original halftone image, and, at subsequent iterations, to the filtered image resulting from the previous iteration. In some embodiments, the gain of the high-stop filter may be modified spatially. This gain may also be scaled, in some embodiments, in inverse proportion to the local gradient estimation. For efficiency, in some embodiments, separable filters may be used to directionally measure gradients and high-frequency content. In some embodiments, further efficiencies may be realized by algebraic simplification and by the use of single channel gradient estimates.

In some embodiments of the present invention, the input image may comprise luminance channel data, chrominance channel data from one or more chrominance channels and other data. In other embodiments, data from a subset of all of an image's channels may be used. In some embodiments, the input image may comprise the data of the luminance channel of the image. In some embodiments, a brightness channel of an image may be used as an input image. Some embodiments of the present invention comprise an iterative process which iterates on multiple channels of the image data.

Some embodiments of the present invention comprise a process in which the data in an input image is corrected based on characteristics of the image data. Characteristics of the image data may comprise the second derivative and the gradient of the image data, in some embodiments. An exemplary embodiment of this process is illustrated in FIG. 7.

Figure 7:
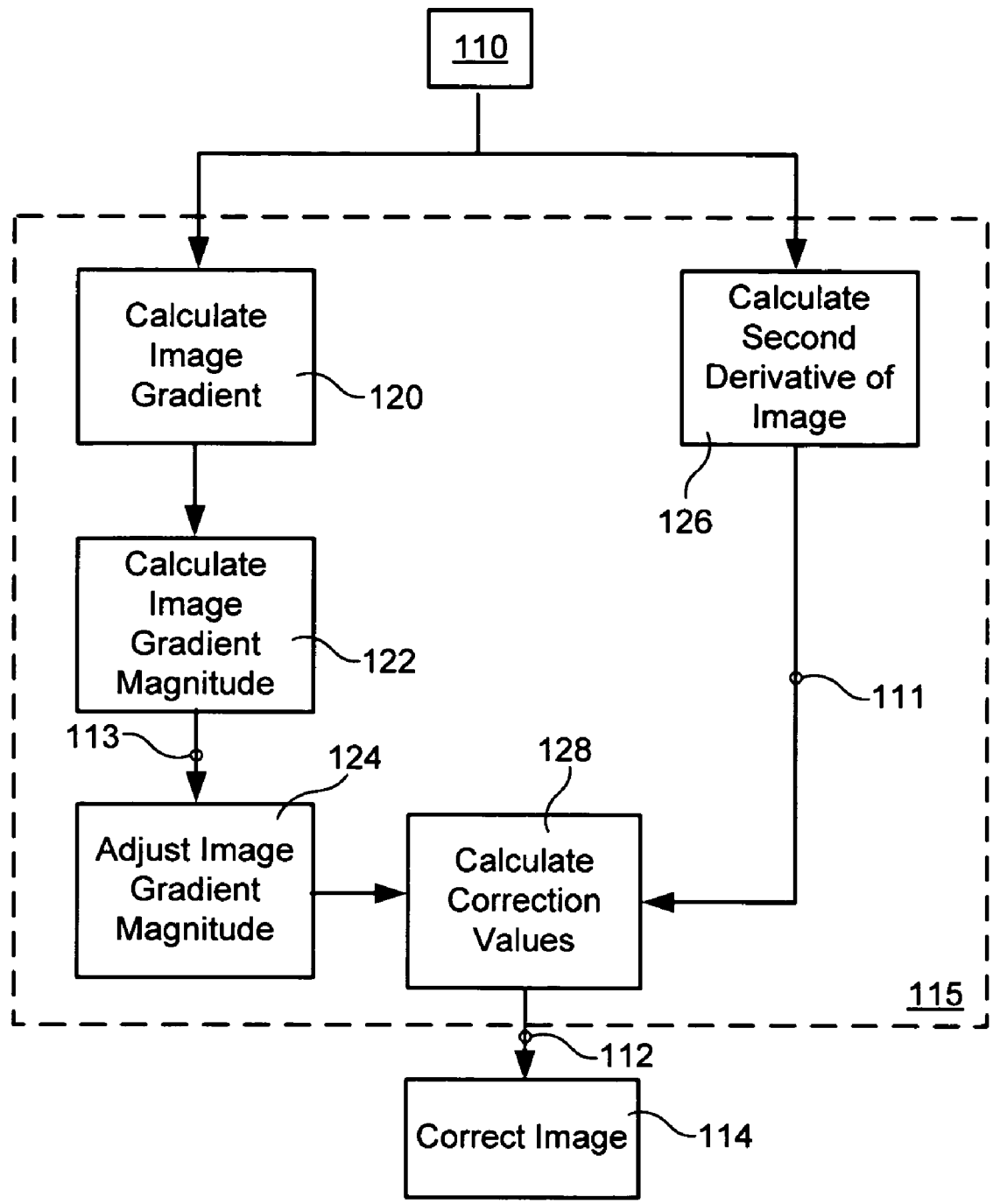
FIG. 7 is a flow diagram showing an exemplary embodiment of the present invention comprising a correction calculator and an image corrector.

In the embodiments illustrated in FIG. 7, a correction image 112 is calculated by a correction calculator 115. This exemplary correction calculator 115 calculates a correction image 112 from the second derivative 111 of the input image 110 and from the adjusted image-gradient magnitude 113. A corrected image 114 may be derived from the correction image 112 and the input image 110.

In these embodiments, the correction calculator 115 comprises an image gradient calculator 120 for calculating an image gradient. In some embodiments the image gradient calculator may calculate the image gradient in multiple directions. These embodiments may also comprise an image gradient magnitude calculator 122, which, in some embodiments, may calculate an image gradient magnitude in multiple directions. These embodiments may further comprise an image gradient magnitude adjuster 124 for adjusting image gradient magnitudes, which, in some embodiments may adjust image gradient magnitudes by a scaling factor or an offset. These embodiments may also comprise a second derivative calculator 126 for calculating the second derivative of an image at one or more pixel locations and in one or more directions. These calculators 120, 122, 124 and 126 provide input to the correction value calculator 128, which processes the output from the calculators 120, 122, 124 and 126 and calculates a correction image 112. The correction image 112 may then be combined with the input image 110 to produce a corrected image 114.

In some embodiments, modification of the image may be based on characteristics of the image in multiple directions. In some embodiments two directions may be used. In some embodiments, the two directions may be the horizontal and vertical directions in the image.

Some embodiments of the present invention comprise producing a modified version of the image by subtracting from an iteration or input version of the image a correction signal proportional to the second derivative of the iteration or input image. In some embodiments, the correction signal may be scaled in inverse proportion to the magnitude of an estimate of the iteration or input image gradient. The iterated version of the image becomes the "input" image or iteration image for the next iteration which, is in turn modified and used as input for the next iteration.

Some embodiments of the present invention may terminate after one iteration or a fixed number of iterations. Some embodiments may terminate the iterative process after a termination criterion is met. In some embodiments of the present invention, the termination criterion may comprise an image quality metric measured on the iterated version of the image. In some embodiments of the present invention, the termination criterion may comprise a metric measured in relation to the change between the iteration-input image and the iterated version of the image.

In some embodiments of the present invention, the termination criterion may comprise a metric measured between multiple channels of image data. In some embodiments of the present invention the termination criterion may comprise a metric measured in relation to the change between the present channel data and the next channel data for a multiplicity of data channels.

In some embodiments of the present invention, the second derivative may be approximated directionally using the convolution kernel [−1 2 −1] in each direction used in calculating the correction signal. In some embodiments of the present invention, the second derivative may be approximated using a kernel that is not separable.

In some embodiments of the present invention, the gradient may be approximated directionally using the convolution kernel [−1 −6 −14 −14 0 14 14 6 1]. In some embodiments, the gradient approximation may be scaled for normalization. In some embodiments of the present invention, the gradient may be approximated using a kernel that is not separable.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

I claim:

1. A method for modifying an image in an imaging system, said method comprising:
   a) in an imaging system, receiving an image for modification;
   b) sending said image to a correction calculator for determination of a first correction and a second correction, wherein said correction calculator performs the steps of:
      i) determining a first image gradient magnitude of said image in a first direction;
      ii) determining a second image gradient magnitude of said image in a second direction;
      iii) determining a second derivative of said image in said first direction;
      iv) determining a second derivative of said image in said second direction;
      v) adjusting said first image gradient magnitude by a first multiplicative scaling factor and a first additive factor to create a first adjusted gradient factor;
      vi) adjusting said second image gradient magnitude by a second multiplicative scaling factor and a second additive factor to create a second adjusted gradient factor;
      vii) dividing said second derivative in a first direction by said first adjusted gradient factor to create said first correction; and
      viii) dividing said second derivative in a second direction by said second adjusted gradient factor to create said second correction; and
   c) modifying said image using said first correction and said second correction, thereby producing a modified image.

2. A method as described in claim 1 wherein steps i-viii are performed on a pixel-by-pixel basis.

3. A method as described in claim 1 wherein said first direction is horizontal within the image.

4. A method as described in claim 1 wherein said second direction is vertical within the image.

5. A method as described in claim 1 wherein said first multiplicative scaling factor and said second multiplicative scaling factor are equal.

6. A method as described in claim 1 wherein said first additive scaling factor and said second additive scaling factor are equal.

7. A method as described in claim 1 wherein said second derivative is an approximation to said second derivative at a pixel in said image, said approximation comprising a convolution centered at said pixel in said image with a kernel wherein said kernel is oriented in the direction of said second derivative.

8. A method as described in claim 7 wherein said kernel comprises [−1 2 −1].

9. A method as described in claim 1 wherein said image gradient is an approximation to said gradient at a pixel in said image, said approximation comprising a convolution centered at said pixel in said image with a kernel wherein said kernel is oriented in the direction of said gradient.

10. A method as described in claim 9 wherein said kernel comprises [−1 −6 −14 −14 0 14 14 6 1].

11. A method, in an imaging system, for generating a modified version of an image while preserving sharp image features, said method comprising iterations wherein each iteration comprises performing the following on a current version of an image:
   a) receiving a current version of an image in a correction calculator in an imaging system;
   b) determining a first image gradient magnitude of said current version of said image in a first direction;
   c) determining a second image gradient magnitude of said current version of said image in a second direction;
   d) determining a second derivative of said current version of said image in said first direction;
   e) determining a second derivative of said current version of said image in said second direction;
   f) adjusting said first image gradient magnitude by a first multiplicative scaling factor and a first additive factor to create a first adjusted gradient factor;
   g) adjusting said second image gradient magnitude by a second multiplicative scaling factor and a second additive factor to create a second adjusted gradient factor;
   h) dividing said second derivative in a first direction by said first adjusted gradient factor to create a first correction;
   i) dividing said second derivative in a second direction by said second adjusted gradient factor to create a second correction;
   j) modifying said current version of said image using said first correction and said second correction, thereby producing a modified version of said current version of said image; and
   k) updating said current version of said image to said modified version of said current version of said image.

12. A method as described in claim 11 wherein steps b-i are performed on a pixel-by-pixel basis.

13. A method as described in claim 11 wherein said iterations terminate after a fixed number of iterations.

14. A method as described in claim 13 wherein said fixed number is one.

15. A method as described in claim 11 wherein said iterations terminate when said modified version of said current version of said image exceeds an image quality threshold.

16. A method as described in claim 11 wherein said iterations terminate when said modified version of said current version of said image differs by less than a difference threshold with respect to said current image.

17. A method as described in claim 11 wherein said first multiplicative factor and said second multiplicative factor vary with iteration.

18. A method as described in claim 11 wherein said first direction is horizontal within the image.

19. A method as described in claim 11 wherein said second direction is vertical within the image.

20. A system for correcting an image, said system comprising:
   a) a receiver for receiving an image for modification;
   b) a correction calculator for producing a correction signal, said correction calculator further comprising;
      i) an image-gradient-magnitude calculator for:
         (1) determining a first image gradient magnitude of said image in a first direction; and
         (2) determining a second image gradient magnitude of said image in a second direction;
      ii) a second-derivative calculator for:
         (1) determining a second derivative of said image in said first direction; and
         (2) determining a second derivative of said image in said second direction;
      iii) an image-gradient-magnitude adjustor for:
         (1) adjusting said first image gradient magnitude by a first multiplicative scaling factor and a first additive factor, thereby generating a first adjusted gradient factor; and
         (2) adjusting said second image gradient magnitude by a second multiplicative scaling factor and a second additive factor, thereby generating a second adjusted gradient factor; and
      iv) a divider for:
         (1) dividing said second derivative in said first direction by said first adjusted gradient factor, thereby producing a first correction; and
         (2) dividing said second derivative in said second direction by said second adjusted gradient factor, thereby producing a second correction; and
   c) a correction circuit for modifying said image using said first correction and said second correction, thereby producing a modified image.

* * * * *